United States Patent
Biere et al.

(10) Patent No.: US 7,907,213 B1
(45) Date of Patent: Mar. 15, 2011

(54) WIRELESS MULTIMEDIA CONTENT AT TELEVISION HOST DEVICE

(75) Inventors: Devon Leon Biere, Olathe, KS (US); Michael Arthur Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1402 days.

(21) Appl. No.: 11/374,650

(22) Filed: Mar. 13, 2006

(51) Int. Cl.
*H04N 5/50* (2006.01)

(52) U.S. Cl. ...................................................... 348/552

(58) Field of Classification Search .................. 348/552, 348/553, 725, 14.02; 725/153, 141; 370/254
See application file for complete search history.

(56) References Cited

U.S. PATENT DOCUMENTS

| 5,905,524 | A  | * | 5/1999  | Sauer ............................ 725/54 |
| 7,450,961 | B1 | * | 11/2008 | Heubel et al. ............... 455/556.1 |
| 7,508,412 | B2 | * | 3/2009  | Liu ............................. 348/14.02 |
| 7,532,879 | B1 | * | 5/2009  | Fujisaki ..................... 455/414.1 |
| 2002/0066115 | A1 | * | 5/2002 | Wendelrup .................... 725/153 |
| 2005/0226170 | A1 | * | 10/2005 | Relan et al. .................. 370/254 |
| 2006/0001737 | A1 |   | 1/2006  | Dawson et al. |
| 2008/0301561 | A1 | * | 12/2008 | Bain ............................. 715/730 |

* cited by examiner

*Primary Examiner* — Paulos M Natnael (57) ABSTRACT

Multimedia content captured by a camera-enabled wireless device may be communicated from the camera-enabled wireless device to a television host device for viewing and/or storage. The multimedia content may be communicated wirelessly from the camera-enabled wireless device to a telecommunications network. The telecommunications network forwards the multimedia content to a media-delivery network, which delivers the multimedia content to the television host device. The television host device treats the multimedia content (presents, stores, etc.) based on user-defined preferences.

18 Claims, 6 Drawing Sheets

WIRELESS MULTIMEDIA CONTENT AT TELEVISION HOST DEVICE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to communicating multimedia content from a wireless device to a television host device and treating the multimedia content at the television host device based on preferences.

BACKGROUND

Digital-camera technology has been integrated into wireless telecommunications devices, such as cell phones, providing a convenient way for users to capture and share images. Initially, such devices were typically limited to capturing only still images. However, wireless telecommunications devices having the ability to capture video images have become more common. The integration allows users to capture video images using their wireless telecommunication devices and to wirelessly transmit the video images to compatible cell phones, email addresses, and/or websites. In any of these cases, however, some combination of hardware and software (e.g., a cell phone and service subscription providing the ability to receive and present video content, a PC with a web browser and internet access, etc.) is required for a recipient to access and view video content. The current state of the art could be improved if users could communicate video content from wireless telecommunications devices to television host devices, such as set-top boxes, that typically receive television content and each television host device could independently determine a treatment (e.g., whether to present, store, etc.) for received multimedia content.

SUMMARY

Embodiments of the present invention are directed to communicating multimedia content from a camera-enabled wireless device to a television host device and treating the multimedia content at the television host device based on preferences. Thus, in one aspect, an embodiment of the present invention relates to a method of treating multimedia content received at a television host device from a camera-enabled wireless device. The method includes receiving, at a television host device, multimedia content from a camera-enabled wireless device, wherein the multimedia content is communicated from the camera-enabled wireless device to the television host device over a communication pathway comprising the camera-enabled wireless device, a telecommunications network in communication with the camera-enabled wireless device, a media-delivery network in communication with the telecommunications network, and the television host device in communication with the media-delivery network. The method also includes determining, at the television host device, a treatment of the multimedia content based on one or more preferences. The method further includes treating the multimedia content in accordance with the determined treatment.

In another aspect of the invention, an embodiment is directed to a method of communicating multimedia content from a camera-enabled wireless device to one or more television host devices. The method includes capturing multimedia content at a camera-enabled wireless device. The method also includes receiving a command to communicate the multimedia content from the camera-enabled wireless device to one or more television host devices. The method further includes communicating the multimedia content to the television host devices, wherein the multimedia content received at each of the television host devices is treated independently of a treatment of the multimedia content received at another of the television host devices.

In a further aspect, an embodiment of the present invention is directed to a system for communicating multimedia content from a camera-enabled wireless device to a television host device and treating the multimedia content at the television host device. The system includes a camera-enabled wireless device, a telecommunications network, a television-service network, and a television host device. The telecommunications network is in communication with the camera-enabled wireless device and is capable of receiving multimedia content from the camera-enabled wireless device. The television-service network is in communication with the telecommunications network and is capable of receiving the multimedia content from the telecommunications network. The television host device is capable receiving the multimedia content from the television-service network and treating the multimedia content based on or more preferences.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

Embodiments of the present invention include, among other things, the integration of one or more communications networks with one or more media-delivery networks. Results of the integration include the ability to communicate multimedia content from a camera-enabled wireless device to a television host device. As used herein, the term "multimedia content" refers to video image content without or without audio content. Multimedia content may be streamed to one or more television host devices as it is captured by a camera-enabled wireless device or may be stored on the camera-enabled wireless device and subsequently communicated to one or more television host devices. In any case, multimedia content is communicated wirelessly to a communications network that forwards the content to one or more media-delivery networks for delivery to one or more television host devices. The user of the camera-enabled wireless device may send multimedia content to one or more destination television host devices (e.g., a user's own television host device or others' television host devices). Moreover, when multimedia content is received at each television host device, the multimedia content may be treated (e.g., presented, stored, etc.) in accordance with user-defined preferences for the particular television host device in conjunction with a variety of different parameters, such as parameters associated with the communicated multimedia content (e.g., originating camera-enabled wireless device, size of content, format of content, etc.) and/or the television host device (e.g., available storage, etc.).

While the type of communications network described in detail herein is a telecommunications network, and, more particularly, a wireless telecommunications network, one skilled in the art will appreciate that the present invention may be implemented with other types of communications networks permitting the multi-directional exchange of information (in any format, including analog). Likewise, one skilled in the art will appreciate that while a television network, and more particularly a cable-television network, is described herein as an example of a media-delivery network, the present invention may be implemented with other types of media-delivery networks that permit the substantially uni-directional delivery of media content.

A telecommunications network that provides telephone services is usually owned by a telecommunications-service provider and is separate from a television network that provides television programming and is owned by a television-service provider. By interfacing the two networks, embodiments of the present invention provide the ability to communicate multimedia content from a camera-enabled wireless device communicating on a communications network to a television host device communicating on a media-delivery network. Although there is no reason that the present invention could not be implemented in a wholly owned scenario wherein both the communications network and the media-delivery network belong to the same entity, the invention is described in detail herein for the exemplary scenario where two entities must cooperatively integrate separate networks to provide the services.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

DAVIC Digital Audio Video Council
DOCSIS Data Over Cable Service Interface Specification
DVR Digital Video Recorder
HDR Hard Disk Recorder
HFC Hybrid Fiber Coaxial
IP Internet Protocol
MAC Media Access Control
PDA Personal Data Assistant
PTR Personal TV Receiver
PVR Personal Video Recorder
PVS Personal Video Station
RF Radio Frequency
STB Set-Top Box
VPN Virtual Private Network Further, various technical terms are used throughout this description. A definition of such terms can be found in *Newton's Telecom Dictionary* by H. Newton, 21st Edition (2005). These definitions are intended to provide a clearer understanding of the ideas disclosed herein but are in no way intended to limit the scope of the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
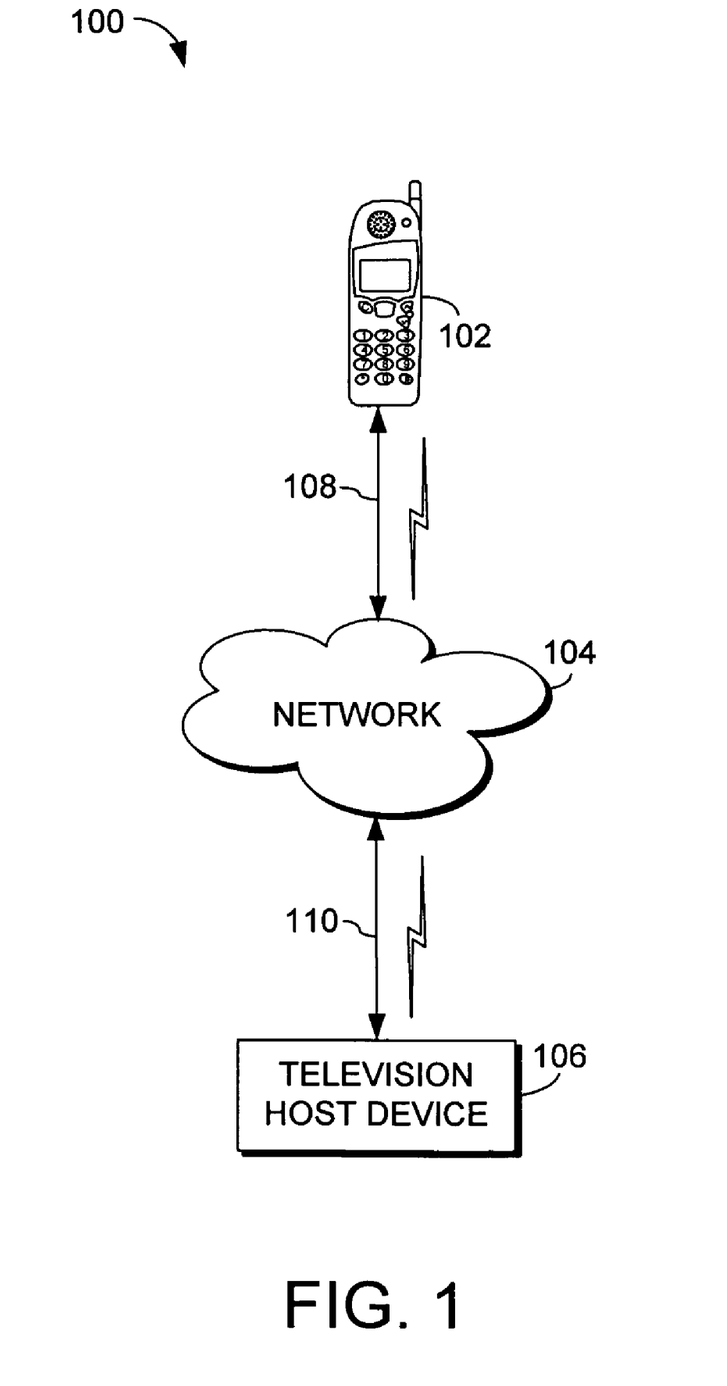
FIG. 1 is a block diagram of a communication path, along which exemplary embodiments of the present invention may be carried out.

Referring to FIG. 1, a block diagram is shown of an exemplary communications path 100 in which exemplary embodiments of the present invention may be employed. It should be understood that this and other arrangements described herein with are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, communications path 100 may include, among other components not shown, a camera-enabled wireless device 102, a network 104, and a television host device 106. The communication path 100 also comprises communications paths 108 and 110. The camera-enabled wireless device 102 may comprise any type of device capable of capturing video images and transmitting those images via a wireless communications network. The camera-enabled wireless device 102 may communicate multimedia content wirelessly to the network 104 via the communications path 108.

The television host device 106 may be any type of device capable of receiving content from a media-delivery network, such as a cable-television network or a satellite-television network. By way of example only and not limitation, the television host device 106 may be a legacy set-top box (STB), an STB having an integrated cable modem, or an integrated terminal device, physically integral, to for example, a television. The television host device 106 may receive multimedia content communicated from the camera-enabled wireless device 102 to the network 104 via the communications path 110, which may include wired (e.g., cable television) and/or wireless (e.g., satellite television) communication.

Entities, such as the camera-enabled wireless device 102 and the television host device 106, may communicate within the network 104 via different protocols, such as the Internet Protocol (IP), for example. The network 104 may comprise one or more private and/or public packet-switched networks (e.g., the Internet). Furthermore, the network 104 may comprise one or more private and/or public circuit-switched networks. In embodiments, the network 104 may include one or more communications networks (e.g., telecommunications networks, wireless telecommunications networks, etc.) and one or more media-delivery networks (e.g., television networks, cable-television networks, satellite-television networks, etc.).

Figure 2A:
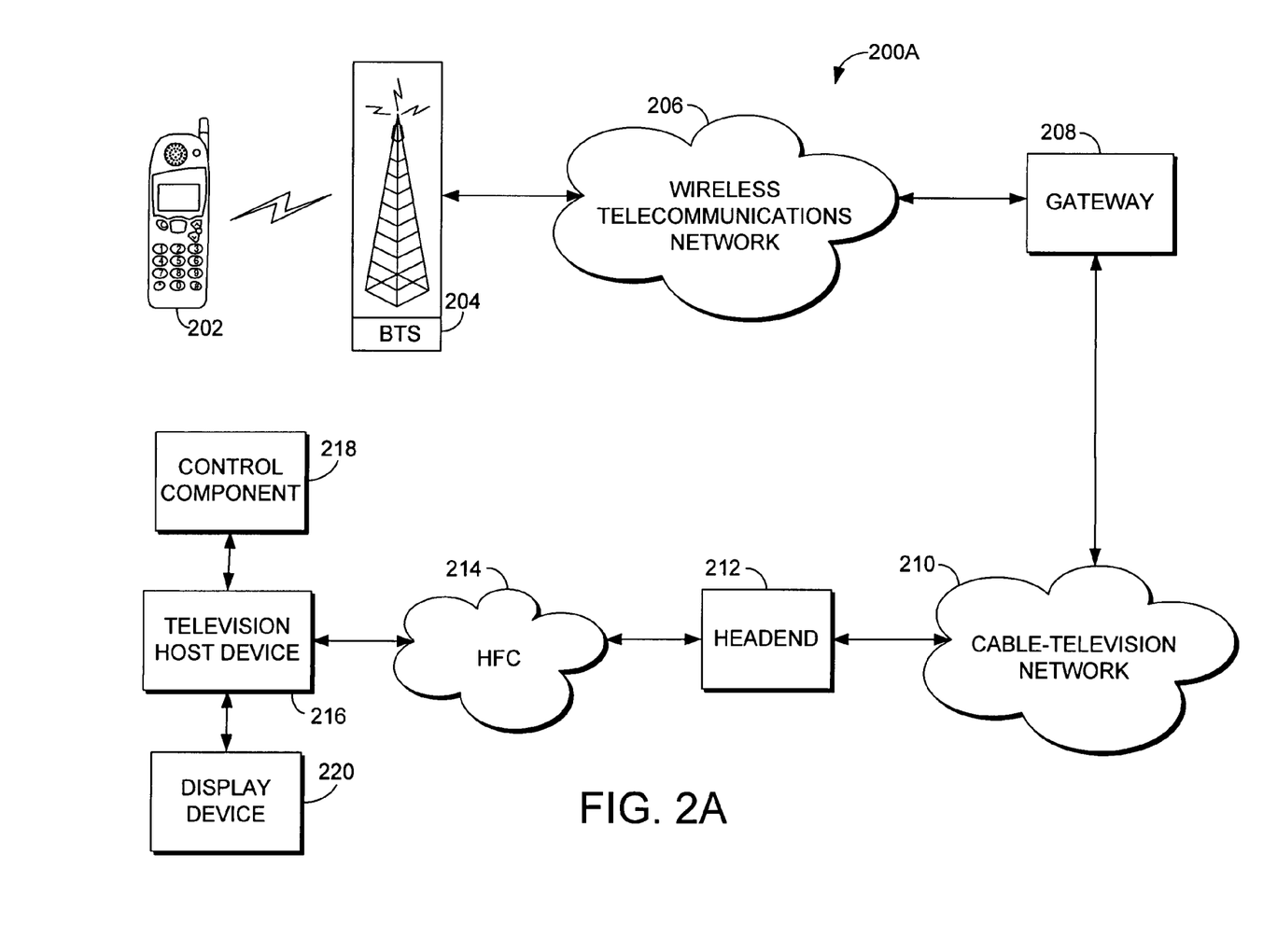
FIG. 2A and FIG. 2B are block diagrams of exemplary systems suitable for use in implementing embodiments of the present invention.

Referring now to FIG. 2A, a block diagram is provided illustrating an exemplary system 200A providing the capability to communicate multimedia content from a camera-enabled wireless device 202 to a television host device 216. As shown in FIG. 2A, the system 200*a* may include, among other components, a camera-enabled wireless device 202, a base transceiver station (BTS) 204, a wireless telecommunications network 206, an intermediate gateway 208, a cable-television network 210, a headend 212, a hybrid fiber coaxial (HFC) network 214, a television host device 216, a control component 218, and a display device 220. The system 200A is an exemplary embodiment of the present invention showing the integration of a wireless telecommunications network 206 and a cable-television network 210, which provides a communication path between the camera-enabled wireless device 202 and the television host device 216. As indicated previously, although a wireless telecommunications network is described in detail herein, other types of communications networks may be employed within the scope of the invention. Likewise, although a cable-television network is described in detail herein, other types of media-delivery networks, such as satellite-television networks, for example, may be employed within the scope of the invention. Additionally, although the system 200*a* is shown with only one of each component, such as a single camera-enabled wireless device 202, a single wireless telecommunications network 206, a single cable-television network 210, and a single television host device 216, it should be understood that any number of components may be included in various embodiments of the present invention. For example, in some embodiments multimedia content may be communicated from the camera-enable wireless device 202 to multiple television host devices via different cable-television networks.

The camera-enabled mobile device 202 may be any type of device capable of capturing video content and communicating the content wirelessly. By way of example and not limitation, the camera-enabled wireless device 202 may be a cell phone, a pager, or a personal data assistant (PDA). To provide wireless service to camera-enabled wireless device 202, the system 200A may include a BTS 204, which provides a wireless coverage area. The BTS 204 may communicate over a wireless air interface with one or more wireless devices, such as the camera-enabled wireless device 202, located in the wireless coverage area. The communication between the BTS 204 and the camera-enabled wireless device 202 may occur in a digital format, such as CDMA, TDMA, GSM, 3G, or 802.11x, or may occur in an analog format, such as AMPS.

To provide camera-enabled wireless device 202 access to the wireless telecommunications network 206, the BTS 204 may be coupled with a base station controller (BSC) (not shown). The BTS 204 may include a packet control function, and a packet data serving node (PDSN) (not shown) may connect the BSC to the wireless telecommunications network 206. The PDSN may then act as a network access server, providing the camera-enabled wireless device 202 access to the wireless telecommunications network 206. Alternatively or additionally, communications system 200A may include other network elements for providing camera-enabled wireless device 202 access to the wireless telecommunications network 206.

The camera-enabled wireless device 202 may be identified by employing any of a number of identifiers. By way of example and not limitation, the camera-enabled wireless device 202 may be identified using a unique. Electronic Serial Number (ESN), which is typically hard-coded into the device, a unique Mobile Identification Number (MIN), which is typically assigned to the device by a telecommunications-service provider, a special authentication key (A-key), which may be used for validating the device's identify, and/or a predetermined username and password. In addition, the camera-enabled wireless device 202 may be capable of engaging in packet-data communication and may be identified by a network address, such as an IP address. The network address may be permanently assigned to the camera-enabled wireless device 202 or may be dynamically assigned using a number of methods, such as a Simple IP process or a Mobile IP process.

In general, the television host device 216 may be any device arranged to receive and display analog and/or digital television content, and which is capable of communicating data to the cable-television network 210. By way of example and not limitation, the television host device 118 may be a set-top box (STB), a legacy box, an STB having an integrated cable modem, a digital video recorder (DVR), a personal video recorder (PVR), a hard disk recorder (HDR), a personal video station (PVS), a personal TV receiver (PTR) and/or an integrated terminal device, physically integral to, for example, a television.

A display device 220 and a control component 218 may be communicatively connected to the television host device 216. The display device 220 may be any type of device capable of displaying television content and other data from the television host device 216. For example, the display device 220 may be a television or monitor. The control component 218 may be an infra-red remote control device sensed by the television host device 216. Other devices, such as mobile telephones, keyboards, or PDAs could provide the same functionality. The connection between the control component 218 and the television host device 216 may be wireless, such as an infra-red, radio, 802.11x, or Bluetooth connection, or wired by a cable or other physical connection such as a Universal Serial Bus (USB) connector.

Entities on the cable-television network 210 are able to communicate with the television host device 216 via the headend 212. Television content and other data may be transmitted from the headend 212 to the television host device 216 using any suitable media, such as any combination of fiber-optic and coaxial cable, making up HFC network 214. The HFC network 214 may contain a number of fiber nodes (not shown), which enable the transition between the fiber-optic and coaxial-cable portions of the network. Any number of fiber nodes may be used to convert from (i) fiber signals (carried by fiber-optic cable from the headend 212 to the fiber nodes) to (ii) RF signals (carried by coaxial cable from the fiber nodes to the television host device 216).

The headend 212 may be connected to multiple types of sources of television, media, and/or data content. The headend 212 may operate to amplify and modulate the video, audio, and data content onto a number of channels, so that the content of these sources may be received by devices, such as television host device 216. The headend 212 may also operate to transmit and receive packet data to and from devices, such as the television host device 216, via the HFC network 214. The packet-data signaling between the headend 212 and the television host device 216 via the HFC network 214 may employ an "out-of-band" signaling channel and may comply with specifications, such as "DAVIC" (Digital Audio Video Council) specifications or "DOCSIS" (Data Over Cable Service Interface Specification) specifications. Communications, such as providing program guide information, performing software updates, fault monitoring, configuration, programming, accounting, and performance monitoring, may be conducted on the out-of-band signaling channel. The out-of-band signaling channel may also be used by the television host device 216 to transmit information to the cable-television network 210, such as registration and authentication messages, requests for program guide information, and pay-per-view ordering messages.

The television host device 216 may have a MAC (Media Access Control) address, which will typically be assigned to the device by the manufacturer and will identify the television host device 216 as a unique physical device. In operation, each time the television host device 216 is powered on, it may transmit to the cable-television network 210, via the out-of-band signaling channel, a registration/authentication message, which may contain the MAC address, as well as any other data uniquely identifying and authenticating television host device 216 to the cable-television network 210. The majority of cable providers use proprietary methods of registration and authentication specific to their particular headend implementation(s) and media host device manufacturer(s); however, some standards are evolving, such as OCAP (Open Cable Application Platform). Once the television host device 216 has registered and authenticated, the cable-television network 210 may assign the television host device 216 a network address to use until the next time the television host device 216 is booted up. It is to this network address that any data bound for television host device 216 may be transmitted.

The cable-television network 210 may then associate the television host device's 216 MAC address or another identifier with the television host device's 216 assigned network address. Through this association, the customer's account then has a unique identifier associated with a unique network address on the cable-television network 210. Typically, this network address will be an IP address, and the cable-television service provider will use IP routing to transmit cable-television content and other data to the television host device 216. However, proprietary addressing schemes, such as a VPN (Virtual Private Network) or non-routable Private IP network created between the headend 212 and the television host device 216 each time the television host device 216 is powered on, may be used as well.

Figure 2B:
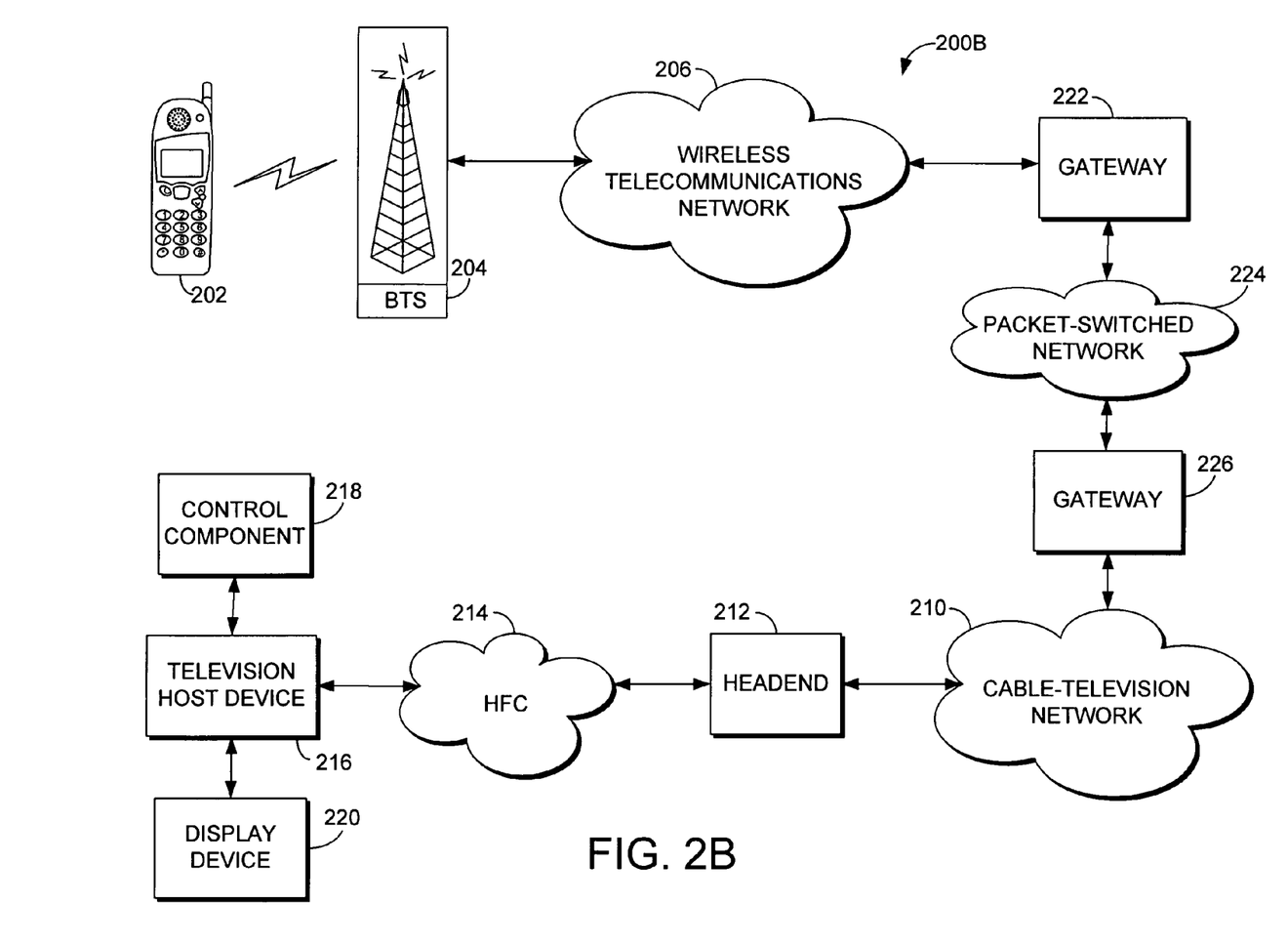

Media-delivery networks, such as the cable-television network 210, are typically isolated and not open to communications with other networks, such as the mobile telecommunications network 206. Therefore, in some embodiments of the present invention, such as that shown in FIG. 2A, an intermediate gateway 208 is provided to bridge between a media-delivery network, such as the cable-television network 210, and a communications network, such as the wireless telecommunications network 206. The intermediate gateway 208 may facilitate communication with entities on the wireless telecommunications network 206, such as the camera-enabled wireless device 202, and entities on the cable-television network 210, such as the television host device 216, thereby allowing communication between entities on the two networks. In other embodiments, such as that shown in FIG. 2B, the media-delivery network and communications network may be interfaced by one or more intermediate networks (e.g., the Internet). For example, as shown in FIG. 2B, a system 200B is illustrated in which the wireless telecommunications network 206 is interfaced with a gateway 222 to a packet-switched network 224. The cable-television network 210 is similarly interfaced with a gateway 226 to the packet-switched network 224. In further embodiments in which the communications and media-delivery networks are under the control of one entity, the use of an intermediate gateway or network to bridge between the two networks may not be required.

Figure 3:
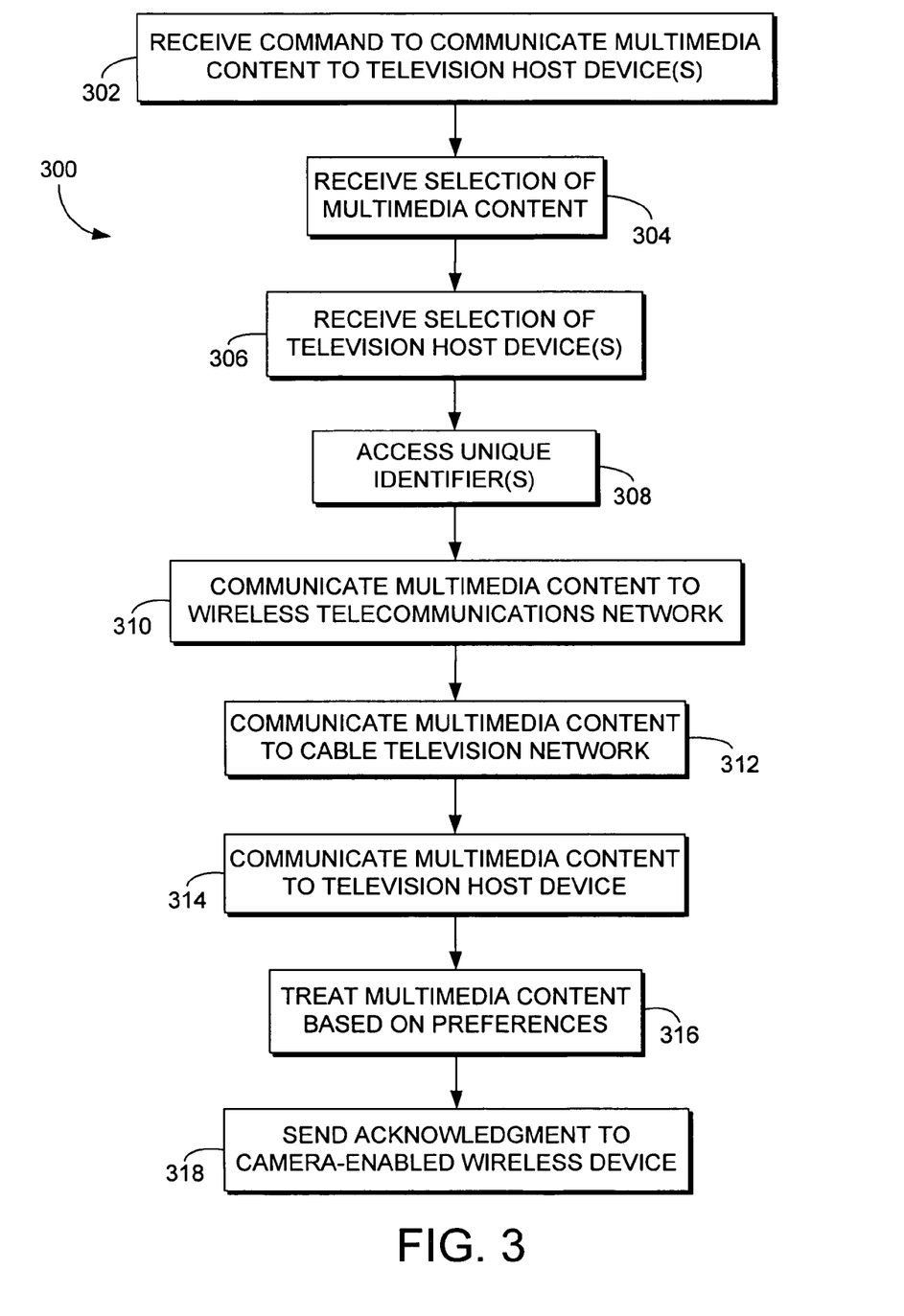
FIG. 3 is a flow diagram showing an exemplary method for communicating multimedia content from a camera-enabled wireless device to a television host device in accordance with an embodiment of the present invention.
Figure 4:
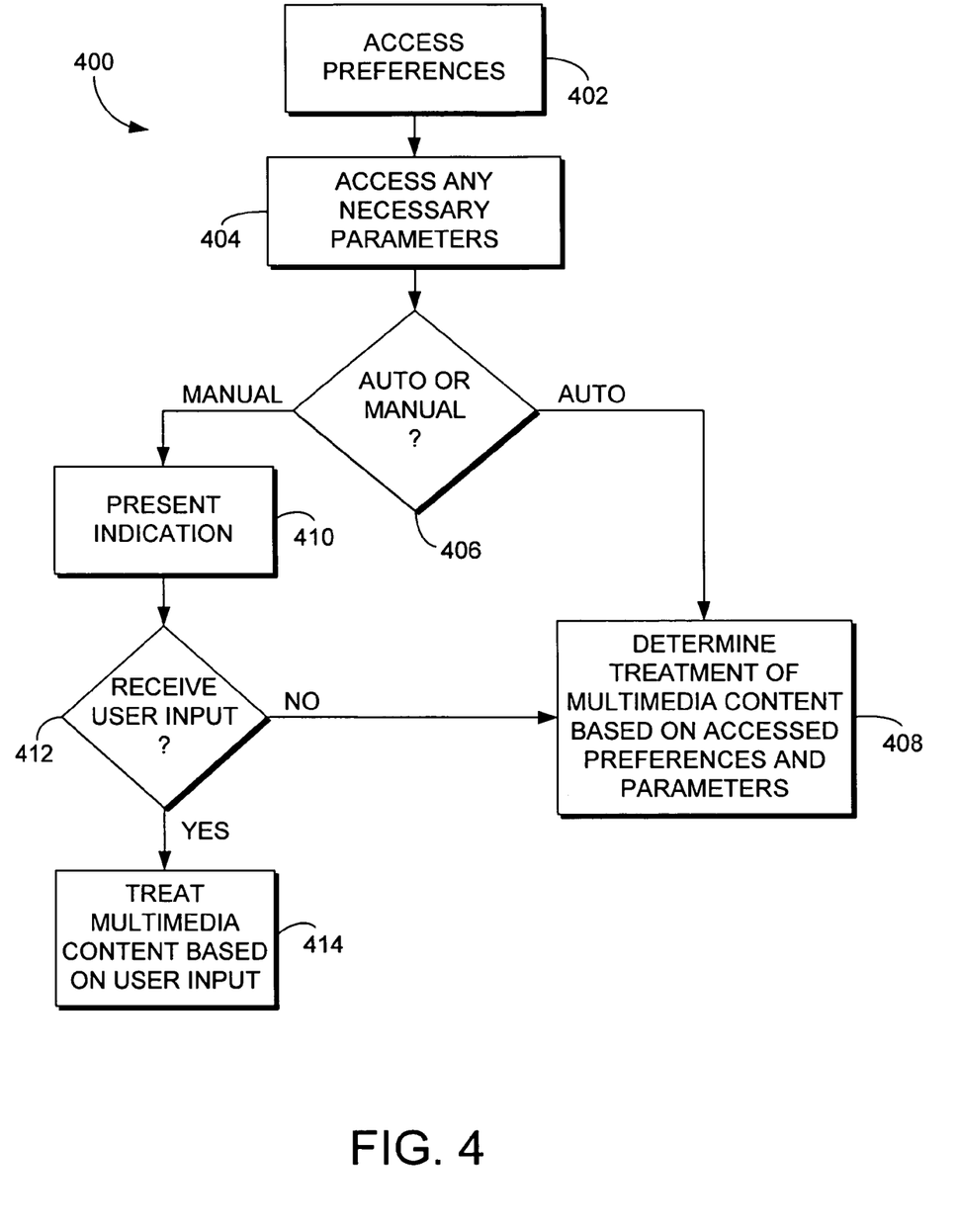
FIG. 4 is a flow diagram showing an exemplary method for treating multimedia content received at a television host device from a camera-enabled wireless device.
Figure 5:
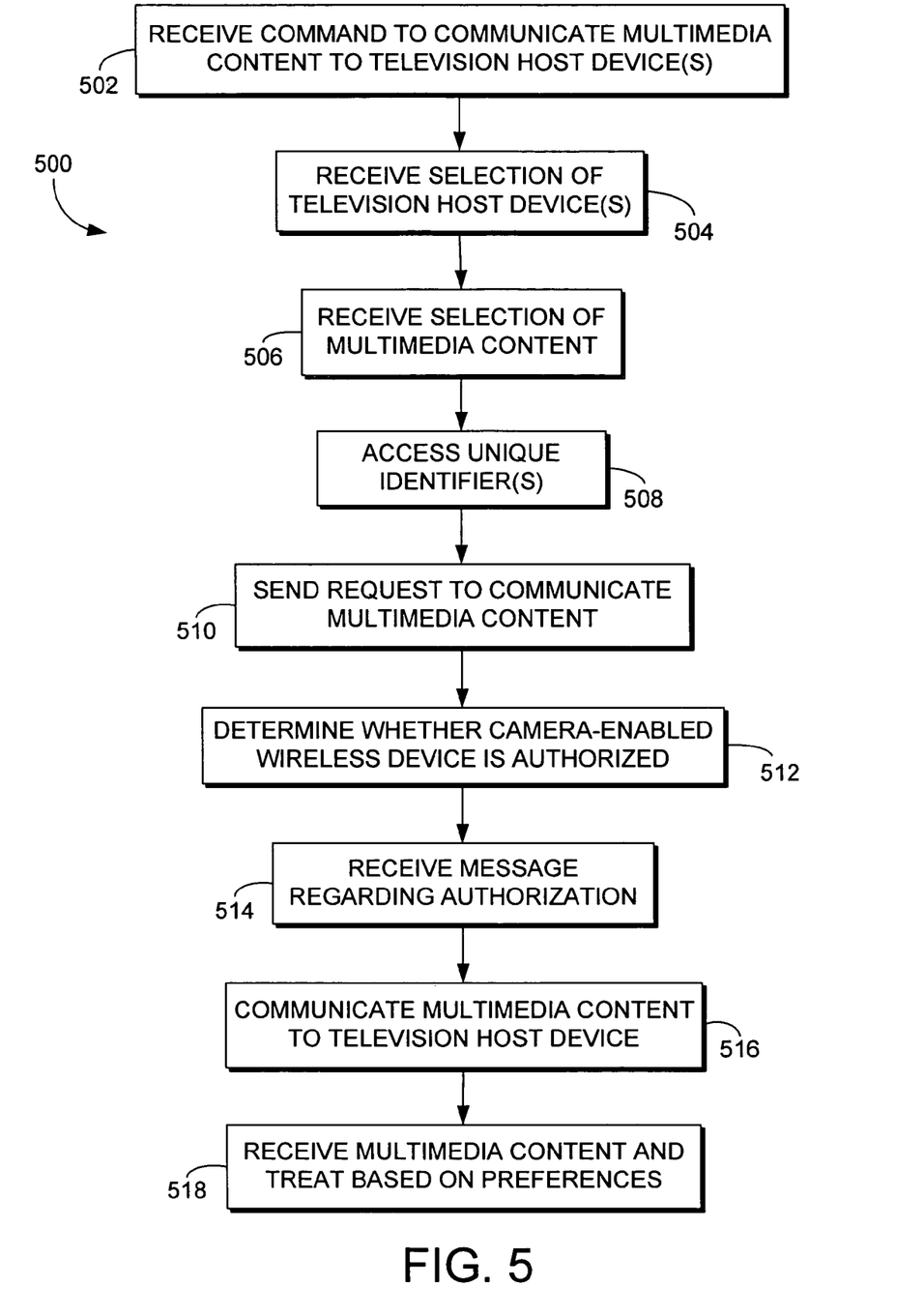
FIG. 5 is a flow diagram showing an exemplary method for communicating multimedia content from a camera-enabled wireless device to a television host device in accordance with another embodiment of the present invention.

The communication of multimedia content from a camera-enabled wireless device to one or more television host devices, as well as the treatment of multimedia content received at each television host device, may be performed in a variety of different ways within the scope of the present invention. FIG. 3 through FIG. 5 provide exemplary methods of communicating multimedia content and determining how to treat the multimedia content at a television host device in accordance with user-defined preferences. Referring initially to FIG. 3, a block diagram is provided showing an exemplary method 300 in which the camera-enabled host device communicates multimedia content to a television host device in accordance with an embodiment of the present invention. Initially, as shown at block 302, the camera-enabled wireless device receives a command to communicate multimedia content to a television host device. For example, a user may wish to send multimedia content captured by the camera-enabled wireless device to one or more destination television host devices of family members, friends, and/or the user's own television host device. The user may provide an initial command to communicate multimedia content in a variety of different ways, including, for example, using the camera-enabled wireless device's user interface to access a menu item or providing a voice command.

As shown at block 304, the camera-enabled wireless device receives a selection of the multimedia content to be communicated. In some embodiments, the camera-enabled wireless device may send multimedia content that was previously captured and stored as a multimedia file. In other embodiments, the camera-enabled wireless device may stream multimedia content as it is captured. Accordingly, at block 304, the user selects a stored multimedia content file to be communicated or otherwise indicates that multimedia content will be streamed as it is captured. This may be accomplished in a number of different ways within the scope of the present invention, including, for example, selecting from a presented list, entering a text command, or providing a voice command.

The camera-enabled wireless device also receives a selection of one or more television host devices to which the multimedia content will be communicated, as shown at block 306. In some embodiments, the camera-enabled wireless device may store information for one or more television host devices, such as the user's own television host device and/or television host devices of the user's friends and family. The camera-enabled wireless device may present a list of those television host devices, and the user may select one or more of them. For example, user-defined nicknames, such as "Mom" or "Home," may be presented for each television host device. The user may scroll through the list and select those television host devices that the user wishes to send the multimedia content. In some embodiments, the camera-enabled wireless device may be associated with only one television host device (e.g., the user's own television host device), and no selection is required as the multimedia content may only be sent to this television host device. In further embodiments, instead of or in addition to selecting a stored television host device, the user may be able to enter a destination television host device. For example, the user may enter a unique identifier, such as a telephone number, associated with a television host device.

At block 308, the camera-enabled wireless device accesses one or more unique identifiers for routing, authorization, and other purposes. For example, the camera-enabled wireless device may access a stored unique identifier for each selected television host device, such as a MAC address, username, nickname or otherwise. Additionally, the camera-enabled host device may access a unique identifier associated with the camera-enabled host device, such as an ESN, MIN, A-key, or otherwise.

The camera-enabled wireless device wirelessly communicates the multimedia content with the unique identifier(s) to a wireless telecommunications network, as shown at block 310. A network server residing on the wireless telecommunications network or an associated network may perform any necessary network address translation required to route the multimedia content using the unique identifiers. For example, using a unique identifier for a destination television host device, the network server may determine the cable-television network on which the television host device resides. In some cases the unique identifier for the originating camera-enabled wireless device may be used for network address translation purpose. Additionally, one or more network components associated with the wireless telecommunications network may provide conversion and/or intermediate storage of the multimedia content as required.

The multimedia content is next communicated from the wireless telecommunications network to the cable-television network, as shown at block 312. Further network address translation may be required by a network server residing on or otherwise in communication with the cable-television network. For example, a specific IP address within the cable-television network may be determined based on the television host device's unique identifier and/or the camera-enabled wireless device's unique identifier. Additionally, one or more network components associated with the cable-television network may provide conversion and/or intermediate storage of the multimedia content as required.

As shown at block 314, the multimedia content is communicated to the destination television host device by the cable-television network. At the television host device, the multimedia content is treated according to user-defined preferences stored on the television host device (as described in further detail below), as shown at block 316. In some embodiments, such as that shown in FIG. 3, an acknowledgement may be transmitted from the television host device to the camera-enabled wireless device, as shown at block 318. The acknowledgement may be an automatically generated message, providing information to the camera-enabled wireless device user, such as an indication that the multimedia content was received and how the multimedia content was treated by the television host device, for example. In some embodiments, a user at the television host device may select a common formatted text message or create a message (e.g., using a control device associated with the television host device) that is communicated back to the camera-enabled wireless device. The acknowledgement message is received by and presented via the camera-enabled wireless device.

A variety of user-defined preferences may be stored by a television host device and dictate how multimedia content communicated to the television host device is treated. The preferences may dictate a range of different treatments, such as, for example, whether to treat the multimedia content manually or automatically, whether to accept the multimedia content, whether to display the multimedia content on an associated display device as it is received, whether to store the multimedia content on the television host device, whether to provide a notification (audible, visual, or otherwise) that multimedia content has been received, and how to display notifications and/or the multimedia content on an associated display device (e.g., entire display, picture-in-picture, etc.).

The treatment of multimedia content by the television host device in accordance with defined preferences may rely on parameters associated with the multimedia content, such as, for example the identification of the originating camera-enabled wireless device and the size of the received multimedia content. Furthermore, the treatment may be based on parameters associated with the television host device, such as, for example, amount of available storage. For instance, a user may define preferences such that multimedia content received from a camera-enabled wireless device associated with one friend is presented when received but not saved, while multimedia content received from a camera-enabled wireless device associated with another friend is saved as it is received but not presented. As another example, a preference may dictate that multimedia content from identified camera-enabled wireless devices are saved only if the content is below a predefined maximum size or if a predefined amount of storage space is available. The predefined maximum size and predefined amount of storage space may vary for different originating camera-enabled wireless devices.

User-defined preferences may also include priorities that dictate how multimedia content from different camera-enabled wireless devices is treated. For instance, a user may define preferences such that multimedia content from a camera-enabled wireless device associated with one friend has a higher priority than multimedia received from a camera-enabled wireless device associated with another friend. Accordingly, if multimedia content is received that is larger than available storage space, stored multimedia content that originated from a lower priority camera-enabled wireless device may be deleted to provide storage space for the currently received multimedia content. The priorities may also be time-based, such that multimedia content that has been saved the longest is deleted. In some cases, a preference may be established such that multimedia content from identified camera-enabled wireless devices is saved until manually erased, such that it will not be removed to create storage space for other received multimedia content.

An exemplary method 400 for treating multimedia content received at a television host device based on user-defined preferences is shown in FIG. 4. Initially, as shown at block 402, after receiving the multimedia content, the television host device accesses stored preferences. As indicated previously, the treatment of multimedia content in accordance with preferences may rely on parameters associated with the received content and the television host device. Accordingly, the television host device accesses any necessary parameters, as shown at block 404. For example, the television host device may access metadata associated with the multimedia content to determine information, such as the identity of the originating camera-enabled wireless device or the size of the multimedia content. Additionally, the television host device may determine information, such as currently available storage space. In some embodiments, the preferences may dictate what parameters are required for determining a treatment of the multimedia content, and the television host device may access only those parameters.

In some embodiments, such as that shown in FIG. 4, an initial determination is made regarding whether the multimedia content will be handled automatically in accordance with defined preferences or if the multimedia content will be handled based on manual input, as shown at block 406. The determination may be based on preferences and accessed parameters. For example, the preferences may dictate that multimedia content from certain camera-enabled wireless devices are treated manually, while multimedia content from other camera-enabled wireless devices are treated automatically. If is it is determined that the multimedia content is to be treated automatically, the television host device determines a treatment of the multimedia content based on the accessed preferences and accessed parameters, as shown at block 408. For example, the television host device may determine whether to present the multimedia content and/or store the multimedia content based on the accessed preferences and parameters.

Alternatively, if it is determined that the multimedia content is to be treated manually, an audible, visual, or other indication may be presented (e.g., via a display device in communication with the television host device), as shown at block 410. For example, a message may be presented on the display device indicating that multimedia content has been received and user input is required regarding how to treat the multimedia content (e.g., present, save, etc.). In some embodiments, the message may be presented as a picture-in-picture or otherwise to prevent any disruption of content that is currently be viewed on the display device.

User input may or may not be received at block 412. For example, if a user is not currently watching content via the television host device or is otherwise unavailable, no user input may be received. If user input is received at block 412, the multimedia content is treated based on the user input, as shown at block 414. Alternatively, if no user input is received at block 412 (e.g., within a predetermined period of time), the multimedia content may be treated automatically in accordance with preferences and accessed parameters, as shown, at block 408.

Turning now to FIG. 5, a block diagram is provided illustrating an exemplary method 500 for communicating multimedia content from a camera-enabled wireless device to a television host device in accordance with another embodiment of the present invention. In the method 500 of FIG. 5, an initial threshold determination is made regarding whether the camera-enabled wireless device is authorized to communicate multimedia content to the destination television host device. Similar to the method 300, the camera-enabled wireless device initially receives a command to communicate multimedia content to a television host device, as shown at block 502. Additionally, the camera-enabled wireless device receives an indication of the one or more television host devices to which to the user wishes to communicate multimedia content, as shown at block 504. In some cases, the camera-enabled wireless device may further receive an indication of the multimedia content that the user wishes to send, as shown at block 506. As noted above, this may include a stored multimedia content file and/or streaming multimedia content as it is captured.

As shown at block 508, the camera-enabled wireless device accesses one or more unique identifiers associated with the camera-enabled wireless device and/or the destination television host device(s). In some cases, metadata associated with multimedia content to be communicated (e.g., size of a file) may be accessed. A message requesting authorization to communicate the multimedia content to the selected television host device and including the one or more unique identifiers and any accessed metadata is communicated from the camera-enabled wireless device, as shown at block 510.

A determination is made at block 512 regarding whether the camera-enabled wireless device is authorized to communicate the multimedia content to the television host device. The determination may be made a variety of different ways within various embodiments of the invention. In some embodiments, a network server on the wireless telecommunications network, the cable-television network, or other associated network may determine such authorization. For example, the network server may maintain a database containing information indicating which camera-enabled wireless devices are authorized to communicate multimedia content to different television host devices. The network server may receive the message and make the determination based on the unique identifiers for the camera-enabled wireless device and the television host device.

In another embodiment, the determination of whether the camera-enabled wireless device is authorized to communicate the multimedia content to the television host device may be made by the television host device itself. In such embodiments, the request may be forwarded to the television host device via the wireless telecommunications network and the cable-television network, employing any network address translation that may be required (such as that described for method 300). After receiving the request, the television host device may make a determination based on preferences stored by the television host device and parameters associated with the request (e.g., the originating camera-enabled media host device, size of file to be transferred, etc.) and/or the television host device (e.g., amount of available storage). This may be accomplished similar to the determination of how to treat multimedia content discussed with reference to method 400 and FIG. 4. The determination may be manual or automatic in accordance with user-defined preferences. For example, if user-defined preferences indicate a manual determination, an indication may be presented and a television host device user may manually indicated whether the multimedia content will be accepted. Alternatively, a determination may be automatically made based on user-defined preferences and parameters associated with the request and/or the television host device. For example, preferences may dictate that multimedia content from particular camera-enabled wireless devices are always denied, multimedia content for other camera-enabled wireless device are authorized if a predetermined amount of storage space is available, and multimedia content for further camera-enabled wireless device are always authorized.

At block 514, a message is transmitted to the camera-enabled wireless device indicating whether the device is authorized to communicate multimedia content to the television host device. If the camera-enabled wireless device is not authorized, an indication as such may be present to the user. Alternatively, as shown at block 516, if the camera-enabled wireless device is authorized, the communication of multimedia content may begin in response to the message received at block 514. The communication of multimedia content from the camera-enabled wireless device to the television host device may be similar to that discussed with reference to the method 300 and FIG. 3. When the television host device receives the multimedia content at block 518, the television host device will determine a treatment of the multimedia content based on preferences and any necessary parameters associated with the multimedia content and/or television host device, such as that discussed with reference to the method 400 and FIG. 4.

As can be seen, embodiments of the present invention provide for the communication of multimedia content from a camera-enabled wireless device to one or more television host device and the treatment of multimedia content received at a television host device in accordance with preferences. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of treating multimedia content received at a television host device from a camera-enabled wireless device, the method comprising:
   receiving, at a television host device, multimedia content from a camera-enabled wireless device, wherein the multimedia content is communicated from the camera-enabled wireless device to the television host device over a communication pathway comprising the camera-enabled wireless device, a telecommunications network in communication with the camera-enabled wireless device, a media-delivery network in communication with the telecommunications network, and the television host device in communication with the media-delivery network;
   determining, at the television host device, a treatment of the multimedia content based on one or more preference, wherein the determining further comprises accessing one or more parameters associated with at least one of the camera-enabled wireless device, the television host device, and the multimedia content and determining a treatment of the multimedia content based on the one or more preferences in conjunction with the one or more parameters; and
   treating the multimedia content in accordance with the determined treatment.

2. The method of claim 1, wherein the one or more preferences define the one or more parameters to access.

3. The method of claim 1, wherein the treatment of the multimedia content at the television host device comprises at least one of presenting the multimedia content, storing the multimedia content, and rejecting the multimedia content.

4. The method of claim 1, further comprising determining whether the camera-enabled wireless device is authorized to communicate the multimedia content to the television host device.

5. The method of claim 4, wherein determining whether the camera-enabled wireless device is authorized to communicate the multimedia content to the television host device comprises:
   receiving, at the television host device, a request to communicate the multimedia content from the camera-enabled wireless device to the television host device; and
   determining whether the camera-enabled wireless device is authorized to communicate the multimedia content to the television host device based on one or more preferences.

6. The method of claim 5, wherein determining whether the camera-enabled wireless device is authorized to communicate the multimedia content to the television host device based on one or more preferences comprises:
   accessing one or more parameters associated with at least one of the camera-enabled wireless device, the television host device, and the multimedia content; and
   determining whether the camera-enabled wireless device is authorized to communicate the multimedia content based on the one or more preferences in conjunction with the one or more parameters.

7. The method of claim 4, wherein determining whether the camera-enabled host device is authorized to communicate the multimedia content to the television host device comprises:
   communicating, from the camera-enabled wireless device to a network device, a request to communicate the multimedia content to the television host device; and
   determining at the network device whether the camera-enabled wireless device is authorized to communicate the multimedia content to the television host device.

8. The method of claim 1, further comprising communicating an acknowledgement message from the television host device to the camera-enabled wireless device.

9. The method of claim 8, wherein the acknowledgement message comprises at least one of an automatically generated text message, an automatically generated audio message, a user-selected text message, a user-selected audio message, a user-generated text message, a user-generated audio message, and a user-generated multimedia message.

10. The method of claim 1, wherein the television host device comprises at least one of set-top box, a legacy box, a digital video recorder, a personal video recorder, a hard disk recorder, a personal video station, a personal TV receiver, and a cable-ready television.

11. The method of claim 1, wherein the multimedia content consists of video image content.

12. One or more computer-readable media having computer-useable instructions embodied thereon for performing the method of claim 1.

13. A method of communicating multimedia content from a camera-enabled wireless device to one or more television host devices, the method comprising:
- capturing multimedia content at a camera-enabled wireless device;
- receiving a command to communicate the multimedia content from the camera-enabled wireless device to one or more television host devices;
- sending, from the camera-enabled wireless device, a request to communicate the multimedia content to the one or more television host devices, wherein in response to the request, a determination is made regarding whether the camera-enabled wireless device is authorized to communicate the multimedia content to at least one of the one or more television host devices; and
- receiving, at the camera-enabled wireless device, an indication that the camera-enabled wireless device is authorized to communicate the multimedia content to the at least one of the one or more television host devices, wherein communicating the multimedia content to the one or more television host devices comprises communicating the multimedia content to the at least one of the one or more television host devices; and
- communicating the multimedia content to the one or more television host devices, wherein the multimedia content received at each of the one or more television host devices is treated independently of a treatment of the multimedia content received at another of the one or more television host devices.

14. The method of claim 13, wherein the multimedia content consists of video image content.

15. The method of claim 13, wherein receiving a command to communicate the multimedia content comprises receiving a selection of the one or more television host devices.

16. The method of claim 13, wherein receiving a command to communicate the multimedia content comprises receiving a selection of the multimedia content.

17. One or more computer-readable media having computer-useable instructions embodied thereon for performing the method of claim 13.

18. One or more computer-storage media having computer-useable instructions that when executed by a computing device cause the computing device to perform a method of treating multimedia content received at a television host device from a camera-enabled wireless device, the method comprising:
- determining, at the television host device, whether the camera-enabled wireless device is authorized to communicate the multimedia content to the television host device;
- receiving, at a television host device, multimedia content from the camera-enabled wireless device, wherein the multimedia content is communicated from the camera-enabled wireless device to the television host device over a communication pathway comprising the camera-enabled wireless device, a telecommunications network in communication with the camera-enabled wireless device, a media-delivery network in communication with the telecommunications network, and the television host device in communication with the media-delivery network;
- determining, at the television host device, a treatment of the multimedia content based on one or more preference; and
- treating the multimedia content in accordance with the determined treatment.

* * * * *